(12) United States Patent
Bhatia et al.

(10) Patent No.: US 11,457,245 B1
(45) Date of Patent: Sep. 27, 2022

(54) STREAMING CONTENT MANAGEMENT

(71) Applicant: Twitch Interactive, Inc., San Francisco, CA (US)

(72) Inventors: Randeep S. Bhatia, Berkeley, CA (US); Christopher Renshaw Fortier, Austin, TX (US); Rohit Puri, Saratoga, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 17/119,957

(22) Filed: Dec. 11, 2020

Related U.S. Application Data (60) Provisional application No. 63/085,064, filed on Sep. 29, 2020.

(51) Int. Cl.
| | |
|---|---|
| *H04N 21/2187* | (2011.01) |
| *H04N 21/258* | (2011.01) |
| *H04N 21/435* | (2011.01) |
| *H04N 21/472* | (2011.01) |
| *H04N 21/439* | (2011.01) |
| *H04N 21/433* | (2011.01) |
| *H04N 21/4402* | (2011.01) |

(52) U.S. Cl.
CPC ... *H04N 21/2187* (2013.01); *H04N 21/25816* (2013.01); *H04N 21/433* (2013.01); *H04N 21/435* (2013.01); *H04N 21/4398* (2013.01); *H04N 21/4402* (2013.01); *H04N 21/47202* (2013.01)

(58) Field of Classification Search
CPC ........ H04N 21/2187; H04N 21/25816; H04N 21/433; H04N 21/435; H04N 21/4398; H04N 21/4402; H04N 21/47202
See application file for complete search history.

(56) References Cited

U.S. PATENT DOCUMENTS

2016/0057471 A1* 2/2016 Eatedali ............. H04N 21/8547

* cited by examiner

*Primary Examiner* — Anthony Bantamoi
(74) *Attorney, Agent, or Firm* — Knobbe, Martens, Olson & Bear, LLP (57) ABSTRACT

A content production system and content management system are provided to produce and manage content with multiple components, such as multi-track content with any number or combination of video tracks, audio tracks, and the like. Individual tracks of the content are selectively included in, or excluded from, different versions of the content such that different versions of the multi-track content may be generated from different subsets of the individual tracks. For example, one version of content may be generated for real-time streaming and may include a first subset or combination of the multiple tracks. Another version of the content may be generated for storage and future on-demand access, and may include a second subset or combination of the multiple tracks. Selection of the particular tracks of the multi-track content to be included in each version may be based on varying types of authorization associated with the individual tracks.

20 Claims, 6 Drawing Sheets

STREAMING CONTENT MANAGEMENT

CROSS-REFERENCE TO RELATED APPLICATION

This application claims priority to U.S. Provisional Patent Application No. 63/085,064, filed Sep. 29, 2020, the content of which is incorporated by reference herein in its entirety.

BACKGROUND

Computing devices can utilize communication networks to exchange data. One computing device (the source computing device) transmits data to another computing device (the destination computing device). In a common scenario, the data may represent multimedia content. For example, the source computing device may capture audio to generate an audio data signal, and capture video to generate a video data signal. The source computing device may then send multimedia data, based on the audio data signal and video data signal, over a network to one or more destination computing devices. The multimedia data may be sent at a future time (e.g., as a recording of prior events) or in real-time (e.g., as a live stream of the audio and video captured by the source device). Destination computing devices may present the multimedia data using various output devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to the production and management of multi-track content such that individual tracks of the content are selectively included in, or excluded from, different versions of the content. The multi-track content may include one or more video tracks, one or more audio tracks, one or more other tracks (e.g., metadata, subtitles), or any combination thereof. Different versions of the multi-track content may be generated from different subsets of the individual tracks. For example, one version of content may be generated for real-time streaming and may include a first subset or combination of the multiple tracks. Another version of the content may be generated for storage and future on-demand access, and may include a second subset or combination of the multiple tracks. Selection of the particular tracks of the multi-track content to be included in each version may be based on varying types of authorization associated with the individual tracks.

Some conventional content management systems manage the authorization of content by allowing content producers to create content for distribution to content consumers, and then preventing distribution of the content if it is not authorized. For example, portions of content may be subject to copyright protection, and the copyright holder may not authorize distribution of the copyrighted portion. A conventional content management system may analyze content that is provided to the system, and determine whether the content is (or includes) unauthorized content. If the content is (or includes) unauthorized content, a conventional content management system may take measures to block distribution of, or access to, the unauthorized content. In some cases, the content may be blocked altogether. However, blocking the content altogether may not be desirable because it eliminates the opportunity for any consumption of the content, even if a significant amount of the content is authorized or is otherwise not subject to authorization-based controls. In other cases, such as when the content includes an audio portion with some amount of unauthorized content while the video portion includes no unauthorized content, a conventional content management system may mute the content so that the unauthorized audio content is effectively prevented from being distributed or accessed. However, muting the entire audio portion of the content may not be desirable because it may excessively impact the consumption experience, even if a significant amount of the audio is authorized or is otherwise not subject to authorization-based controls.

Some aspects of the present disclosure address the issues above, among others, through the use of multi-track data streams. When a content item is being produced, the content item may include some combination of media data portions in various formats. In some embodiments, the media data portions may include: one or more video portions comprising video data encoded in a video data format (e.g., Moving Pictures Expert Group 4 ("MPEG-4"), Windows Media Video ("WMV"), etc.), one or more audio portions comprising audio data encoded in an audio data format (Moving Picture Experts Group Audio Layer III ("MP3"), Advanced Audio Encoding ("AAC"), Windows Media Audio ("WMA"), Free Lossless Audio Codec ("FLAC"), etc.), and/or one or more other portions. Illustratively, a particular content item may include a video portion (e.g., output of a video camera or a screen capture system), a primary audio portion (e.g., user commentary), and an auxiliary audio portion (e.g., background music). To facilitate the selective use of different combinations of the content portions in different versions of the content, a content producer may generate a multi-track data stream in which each portion of content is included in a different track, and/or different combinations of portions are included in different tracks. In some embodiments, a multi-track data format may be used to structure a multi-track data stream such that individual tracks of the stream remain separable or otherwise separately accessible. For example, a data stream may be structured, transmitted, and processed using Real-Time Messaging Protocol ("RTMP"). The multi-track data stream may include a primary video track for a video portion of the content, a primary audio track for an audio portion of the content, and a supplemental track (e.g., a metadata track) that is not necessarily limited to—or specifically designated for—audio or video portions of content. To include an additional portion or additional combination of portions of content in such a multi-track data stream, the additional portion or combination may be included in the supplemental track. In some embodiments, if the supplemental track of a multi-track data stream is a metadata track, and an alternative combination or subset of audio portions (e.g., audio that includes background music, or the background music alone) is to be used in generating certain versions of the content, then the alternative combination or portion may be encoded as metadata and transmitted in the metadata track of the multi-track stream. For example, the data in the metadata track may be encoded in a metadata format (e.g., a string or binary format, a particular data structure, etc.). Typically, the metadata may include information about the content, such as title, copyright information, duration, creation date, etc. To include additional or alternative combinations or portions of content in the multi-track data stream, the additional/alternative portions may be encoded such that they are able to be included as metadata in the multi-track data stream. For example, an audio data portion (such as a packet of audio data) may then be encoded into a metadata packet or other data structure to be included in the metadata track. The encoding may result in the audio data packet being wrapped in the metadata packet such that the audio data packet is the payload of the metadata packet, and the metadata packet may include any other data elements (e.g., header information) typically included in a metadata. In this way, each individual portion of content, or multiple combinations of the content portions, may be provided to the content management system in a single stream. Moreover, the multi-track data stream may be structured such that the different tracks are synchronized (e.g., each track remains aligned according to a production or presentation timeline).

Additional aspects of the present disclosure relate to selectively including or excluding individual tracks of multi-track content when generating different versions of the content, such as different versions for distribution using different distribution protocols. The individual tracks may be selected based on an authorization attribute associated with the individual tracks or content represented by the data therein. In some embodiments, the authorization attribute may be based on a copyright restriction or license, a security level, a localization requirement, etc. Returning to the example above, the content producer may provide a multi-track data stream with a primary video track for all video that is to be distributed with the content, a primary audio track (e.g., user commentary), and a supplemental track with an alternative audio portion or combination of audio portions (e.g., the background music, or a combination of the user commentary and background music). One track of the multi-track content item, such as the supplemental track that includes the background music, may be associated with an authorization attribute based on a copyright restriction for the background music. Illustratively, the copyright restriction may be a prohibition on storing the background music and distributing the background for presentation on-demand (rather than in a real-time live stream). Accordingly, the content management system may output different versions of the multi-track content for distribution using different distribution protocols. For example, a first distribution protocol may be a live streaming distribution protocol (e.g., Hypertext Transfer Protocol Live Streaming ("HLS"), Real Time Messaging Protocol ("RTMP"), Real Time Streaming Protocol ("RTSP"), Moving Pictures Experts Group-Dynamic Streaming over Hypertext Transfer Protocol ("MPEG-DASH"), etc.) in which a live stream version that is provided immediately or substantially immediately to content consumers in real-time is generated. A second distribution protocol may be an on-demand distribution protocol in which a saved version that is provided afterwards to content consumers "on demand" is generated (e.g., as a video on demand or "VOD" version, such as an MPEG-4 version, WMV version, etc.). Because there is no restriction on the background music being distributed in a live stream, the live stream version may include both the commentary and the background music. However, due to the prohibition on storing the background music and distributing it for presentation on demand, the saved version may include the video track and an audio track of the user commentary without the background music. The background music is excluded from the saved version so that it is not able to be distributed on demand. In this way, the content management system can generate versions of multi-track content with as much content as is authorized for some distribution channels, while also selectively excluding portions of content from different versions of content generated to comply with authorization restrictions associated with other distribution channels.

Various aspects of the disclosure will now be described with regard to certain examples and embodiments, which are intended to illustrate but not limit the disclosure. Although aspects of some embodiments described in the disclosure will focus, for the purpose of illustration, on particular examples of data stream formats, authorization restrictions, and content distribution channels, the examples are illustrative only and are not intended to be limiting. In some embodiments, the techniques described herein may be applied to additional or alternative data stream formats, authorization restrictions, content distribution channels, and the like.

Network Content Distribution Environment

Figure 1:
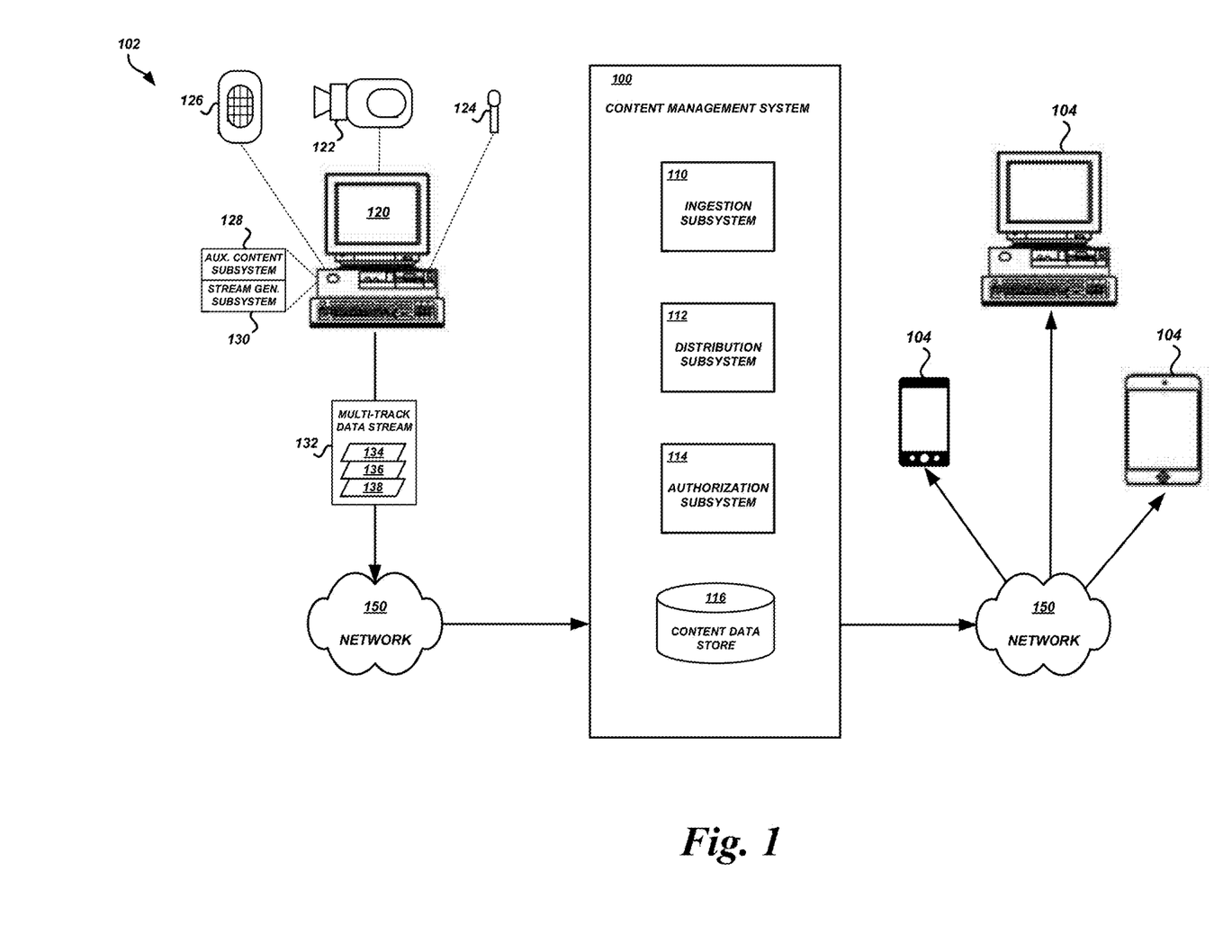
FIG. 1 is a block diagram illustrating various data flows and interactions between a content producer system, a content management system, and one or more content consumer systems according to some embodiments.

With reference to an illustrative embodiment, FIG. 1 shows an example network environment in which aspects of the present disclosure may be implemented. In some embodiments, as shown, the network environment may include a content management system 100 (also referred to as a "content manager"), any number of content production systems 102 (also referred to as "content producers"), and any number of content consumption systems 104 (also referred to as "content consumers"). The content manager 100, content producer(s) 102, and content consumer(s) 104 may communicate with each other via one or more communication networks 150.

In some embodiments, a communication network 150 (also referred to simply as a "network") may be a publicly-accessible network of linked networks, possibly operated by various distinct parties, such as the Internet. In some cases, the network 150 may be or include a private network, personal area network, local area network, wide area network, global area network, cable network, satellite network, cellular data network, etc., or a combination thereof, some or all of which may or may not have access to and/or from the Internet.

The content management system 100 may be a logical association of one or more computing devices for ingesting, processing, storing, and distributing content. For example, the content management system 100 can include an ingestion subsystem 110 for obtaining and processing multi-track content from content producers 102. The content management system 100 may also include a distribution subsystem 112 for managing the distribution of various versions of content to content consumers 104. The content management system 100 may also include an authorization subsystem 114 for managing authorization attributes of individual content items that may be included as tracks of multi-track content streams. The content management system 100 may also include a content data store 116 for storing versions of content that are to be distributed in distribution channels other than "live stream" channels.

The content management system 100 (or individual components thereof, such as the ingestion subsystem 110, the distribution subsystem 112, the authorization subsystem 114, the content data store 116, etc.) may be implemented on one or more physical server computing devices. In some embodiments, the content management system 100 (or individual components thereof) may be implemented on one or more host devices, such as blade servers, midrange computing devices, mainframe computers, desktop computers, or any other computing device configured to provide computing services and resources. For example, a single host device may execute one or more ingestion subsystems 110, distribution subsystems 112, authorization subsystems 114, content data stores 116, some combination thereof, etc. The content management system 100 may include any number of such hosts.

In some embodiments, the features and services provided by the content management system 100 may be implemented as web services consumable via one or more communication networks. In further embodiments, the content management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

A content consumer 104 may be any of a wide variety of electronic devices with content presentation capabilities, including televisions, personal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances.

A content producer 102 may include any of a wide variety of computing devices 120, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. The computing device 120 may provide processing and network communication capabilities to facilitate the generation and transmission of multi-track content to the content management system 100. The content producer 102 may have various input and/or output components that may be integrated into or in communication with the computing device 120. For example, the content producer 102 may include a camera 122 (or other image sensor) to generate video or other image data, a microphone 124 (or other audio sensor) to generate audio data, and/or a speaker 126 (or other audio output) to present audio. The content producer 102 may include various subsystems to manage the presentation of content and generation of multi-track content. For example, the content producer 102 may include an auxiliary content subsystem 128 to obtain auxiliary content that is presented and/or included in a multi-track stream, and a stream generation subsystem 130 to generate a multi-track stream from various input sources and manage transmission of the multi-track stream to the content management system 100. The auxiliary content subsystem 128 and/or stream generation subsystem 130 may be implemented in hardware, or in a combination of hardware and software. For example, computer-executable instructions may be loaded into computer-readable memory and executed by one or more processors of a computing device 120 to provide the functionality of the auxiliary content subsystem 128 and/or stream generation subsystem 130.

In an illustrative example, a user may wish to generate a multimedia stream of activities occurring near and/or within the content production system 102. The user may use the content production system 102 to capture video (e.g., of the user's actions and/or the actions of others) and audio (e.g., of the user and/or others speaker). The user may also use the content production system 102 to present auxiliary audio during the capture of video and audio (e.g., as background music). The user may wish to distribute a compilation of all of these forms of content substantially as the user experiences them during content production: as a single synchronized stream of multimedia content.

As shown in FIG. 1, the content producer 102 may generate and transmit a multi-track stream 132 that includes a primary video track 134, a primary audio track 136, and a supplemental track 138.

In a first configuration, the primary video track 134 may include or represent the output of the camera 122. The primary audio track 136 may include or represent the output of the microphone 124. The supplemental track may include or represent the auxiliary audio obtained by the auxiliary content subsystem 128 and presented via the speaker 126. By separating the different portions of content into different tracks altogether, the content management system 100 may selectively distribute and/or save different combinations or subsets of tracks within the multi-track stream 132. In some embodiments, the supplemental track 138 may include additional or alternative video or audio portions and/or other content portions altogether (e.g., subtitles, metadata, etc.).

In some embodiments, a second configuration of tracks—different than the first configuration of tracks—may be used. For example, the primary video track 134 may include or represent the output of the camera 122. The primary audio track 136 may include or represent all audio that is part of the content: the output of the microphone 124 and the auxiliary audio obtained by the auxiliary content subsystem 128 and presented via the speaker 126. The supplemental track 138 may include additional or alternative video or audio portions and/or other content portions altogether (e.g., subtitles, metadata, etc.). In this example, the only portion of the content included in the supplemental track 138 may be the output of the microphone 124. Thus, the supplemental track 138 may exclude other forms of audio that are present in the primary audio track 136 such as the auxiliary audio that was obtained by the auxiliary content subsystem 128 and presented via the speaker 126. The supplemental track 138 may exclude the auxiliary audio because the auxiliary audio may be associated with a different authorization attribute than the remaining portions of the content (e.g., due to copyright restrictions). By including different combinations or subsets of content portions in separate tracks within the multi-track stream 132, they may be selectively distributed and/or saved by the content management system 100.

The ingestion subsystem 110 may receive and process the multi-track stream 132 into multiple versions of content by selectively including and/or excluding individual tracks 134, 136, 138 from different versions. As described in greater detail below, the ingestion subsystem 110 may selectively include and/or exclude individual tracks based on authorization attributes associated with the individual tracks.

In one specific example using the first configuration of tracks described above, the ingestion subsystem 110 may generate a first version to be distributed to content consumers 104 in a substantially real-time live stream, and a second version to be stored in the content data store 116 for distribution to content consumers 104 at a later time in an on-demand stream or download. The content included in certain tracks, such as auxiliary audio in the supplemental track 138, may be associated with an authorization attribute that prohibits on-demand distribution but permits live streaming. Thus, ingestion subsystem 110 may generate the live stream version using the video content from the primary video track 134, the audio content from the primary audio track 136, and the auxiliary content from the supplemental track 138. The ingestion subsystem 110 may generate the separate on-demand version using the video content from the primary video track 134 and the audio content from the primary audio track 136, without including the auxiliary content from the supplemental track 138.

In another specific example using the second configuration of tracks described above, the content included in certain tracks, such as the auxiliary audio included with the commentary in the primary audio track 136, may be associated with an authorization attribute that prohibits on-demand distribution but permits live streaming. Thus, ingestion subsystem 110 may generate the live stream version using the video content from the primary video track 134 and the comprehensive audio content from the primary audio track 136. The ingestion subsystem 110 may generate the separate on-demand version using the video content from the primary video track 134 and the commentary-only audio content from the supplemental track 138, without using the primary audio track 136 that includes the auxiliary content in this example.

The distribution subsystem 112 can provide a live stream version of the content created by the content producer 102 to one or more content consumers 104. At a later time, the distribution subsystem 112 can obtain an on-demand version of the content from the content data store 116 and provide it to one or more content consumers 104.

Multi-Track Content Production

Figure 2:
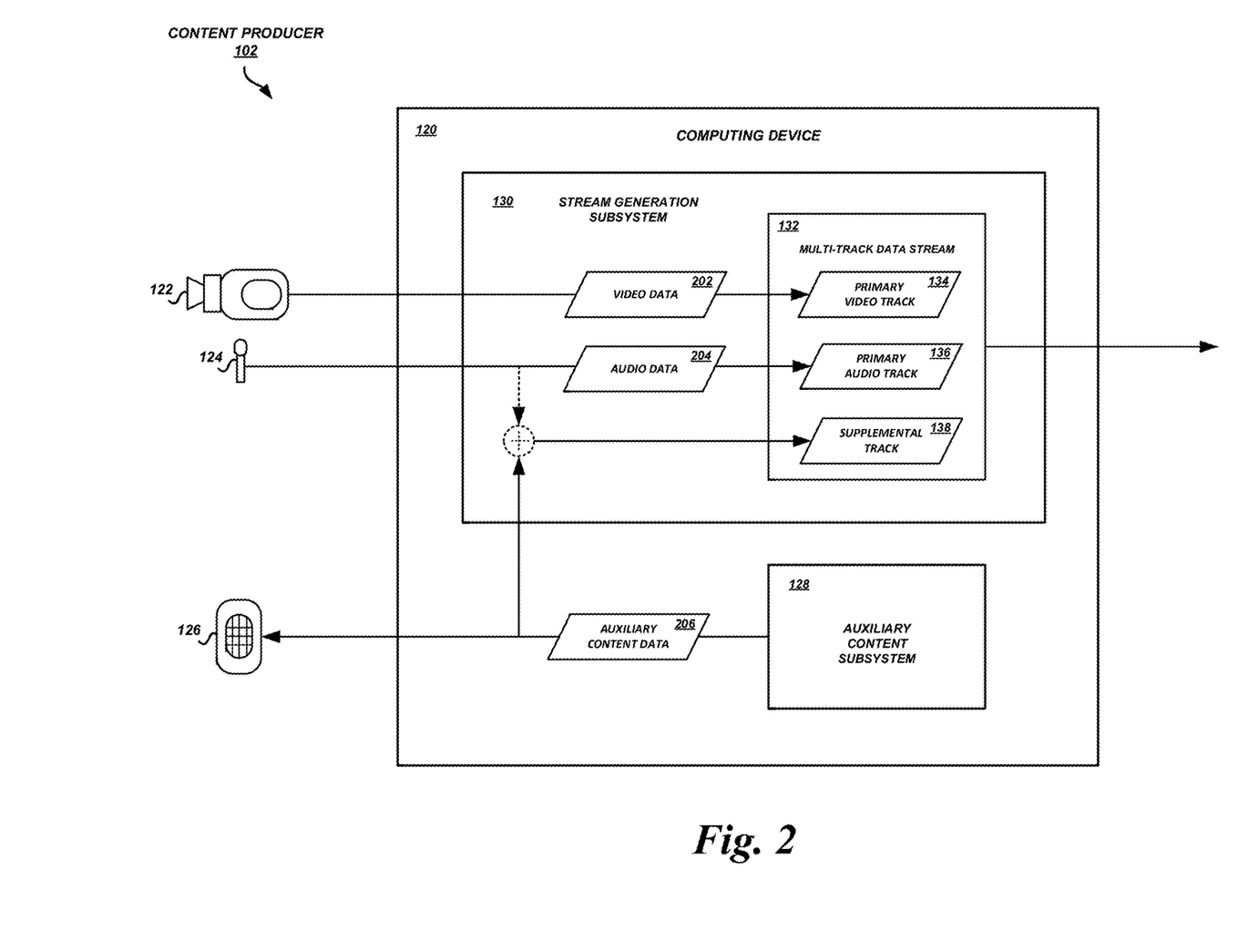
FIG. 2 is block diagram illustrating various data flows and interactions between components of a content producer system to produce multi-track content according to some embodiments.

FIG. 2 shows example data flows and interactions between components of a content production system 102 to create multi-track content. As shown, various forms of input data may be processed by the stream generation subsystem 130 executing on the computing device 120. The stream generation subsystem 130 may include the various forms of input data in various combinations in a multi-track data stream 132 that the stream generation subsystem 130 generates.

A camera 122 may generate video data 202 regarding objects or events captured by the camera 122. The video data 202 may be provided to the stream generation subsystem 130 for use in generating the multi-track data stream 132. Although only one camera 122 is shown, in some embodiments additional cameras 122 and/or alternative components may be used to generate video data 202. For example, a screen capture component (not shown) may be used to generate video data 202 regarding content presented on a display of the computing device 120.

A microphone 124 may generate audio data 204 regarding utterances or other sounds captured by the microphone 124. The audio data 204 may be provided to the stream generation subsystem 130 for use in generating the multi-track data stream 132. Although only one microphone 124 is shown, in some embodiments additional microphones 124 and/or alternative components may be used to generate audio data 204. For example, a system audio capture component (not shown) may be used to generate audio data 204 associated with content presented on a display of the computing device 120.

An auxiliary content subsystem 128 may generate auxiliary content data 206 regarding auxiliary content presented during production of the content. The auxiliary content data 206 may be used to present auxiliary content to the user (e.g., via speaker 126) and also provided to the stream generation subsystem 130 for use in generating the multi-track data stream 132. Illustratively, the auxiliary content may be auxiliary audio, such as music selected by the user to be included in the content. The auxiliary content subsystem 128 may maintain a catalog of auxiliary content that may be presented and included in multi-track content generated by the content production system 102. In some embodiments, the auxiliary content subsystem 128 may obtain the auxiliary content from another system, such as the authorization subsystem 114 or some other module or component of the content management system 100. Although only one auxiliary content subsystem 128 is shown, in some embodiments additional auxiliary content subsystems 128 and/or alternative components may be used to generate auxiliary content data 206.

The stream generation subsystem 130 may generate various tracks of the multi-track data stream 132 from various individual sources or combinations of input data based on attributes of the input data or sources thereof. In one specific non-limiting embodiment, each item or stream of input data may be associated with a source attribute identifying the source of the input data: a source attribute of the video data 202 may identify the camera 122 as the source of the data; a source attribute of the audio data 204 may identify the microphone as the source of the data; and a source attribute of the auxiliary content data 206 may identify the auxiliary content subsystem 128 as the source of the data. The source attributes may be specified within the respected items or streams of input data, or the stream generation subsystem 130 may obtain the source attributes in some other way such as from a predetermined mapping of particular streams of input data to particular data sources.

The stream generation subsystem 130 may access, or be configured to automatically implement, rules for combining and/or separating input data into particular tracks of the multi-track data stream 132. For example, a rule may specify that the video data 202 (or data derived therefrom) is to be included a primary video track 134 of the multi-track data stream 132. If different portions of video data 202 are obtained from different sources (e.g., different cameras 122, a camera 122 and a screen capture component, etc.), the stream generation subsystem 130 may determine whether to combine the video data into a single video track 134 or to separate video data 202 from one or more sources into a supplemental track 138 depending upon the identity of the source of each portion of video data 202. In a similar manner, a rule may specify that the audio data 204 (or data derived therefrom) is to be included a primary audio track 136 of the multi-track data stream 132 and/or included in a supplemental track 138 depending upon the identity of the source of each portion of audio data 204. In a similar manner, a rule may specify that the auxiliary content data 206 (or data derived therefrom) is to be included a primary video track 134, a primary audio track 136, and/or a supplemental track 138 depending upon the identity of the source of each portion of auxiliary content data 206.

In the example shown in FIG. 2, the stream generation subsystem 130 may use one or more rules to determine that any video data 202 is to be included in the primary video track 134. The stream generation subsystem 130 may also determine that any audio data 204 from a list of certain sources, such as a microphone 124, is to be included in both the primary audio track 136 and also the supplemental track 138. The stream generation subsystem 130 may further determine that any auxiliary content data 206 from a list of certain sources, such as the auxiliary content subsystem 128, is audio in nature and is to be included in the supplemental track 138 but not in the primary audio track 136. To include both the audio data 204 and auxiliary content data 206 in the supplemental track 138, the stream generation subsystem 130 may combine the data 204 and 206 (e.g., using an audio mixing component or algorithm) into combined audio data.

The different treatment of audio data 204 and the auxiliary content data 206—even when the auxiliary content data 206 is audio in nature—is due to the different data sources. The auxiliary content subsystem 128 may be configured to provide access to auxiliary content that has authorization attributes prohibiting certain types of distribution or other uses of the auxiliary content. For example, the auxiliary content may be protected by copyright and may be available under a license that limits use of the auxiliary content to specific distribution channels (e.g. only live streams, with no on-demand access). To facilitate the creation of different versions of the content appropriate for different distribution channels, the stream generation subsystem 130 may create different audio tracks that can be selectively included in, or excluded from, the different versions. In this example, the different audio tracks are: (1) the primary audio track 136 that includes the audio data 204 from the microphone but excludes the auxiliary content data 206 from the auxiliary content subsystem 128; and (2) the supplemental track 138 that includes both the audio data 204 from the microphone 124 and the auxiliary content data 206 from the auxiliary content subsystem 128. In another example, a different configuration of tracks is used: (1) the primary audio track 136 includes the audio data 204 from the microphone 124; and (2) the supplemental track 138 includes the auxiliary content data 206 from the auxiliary content subsystem 128.

Figure 3:
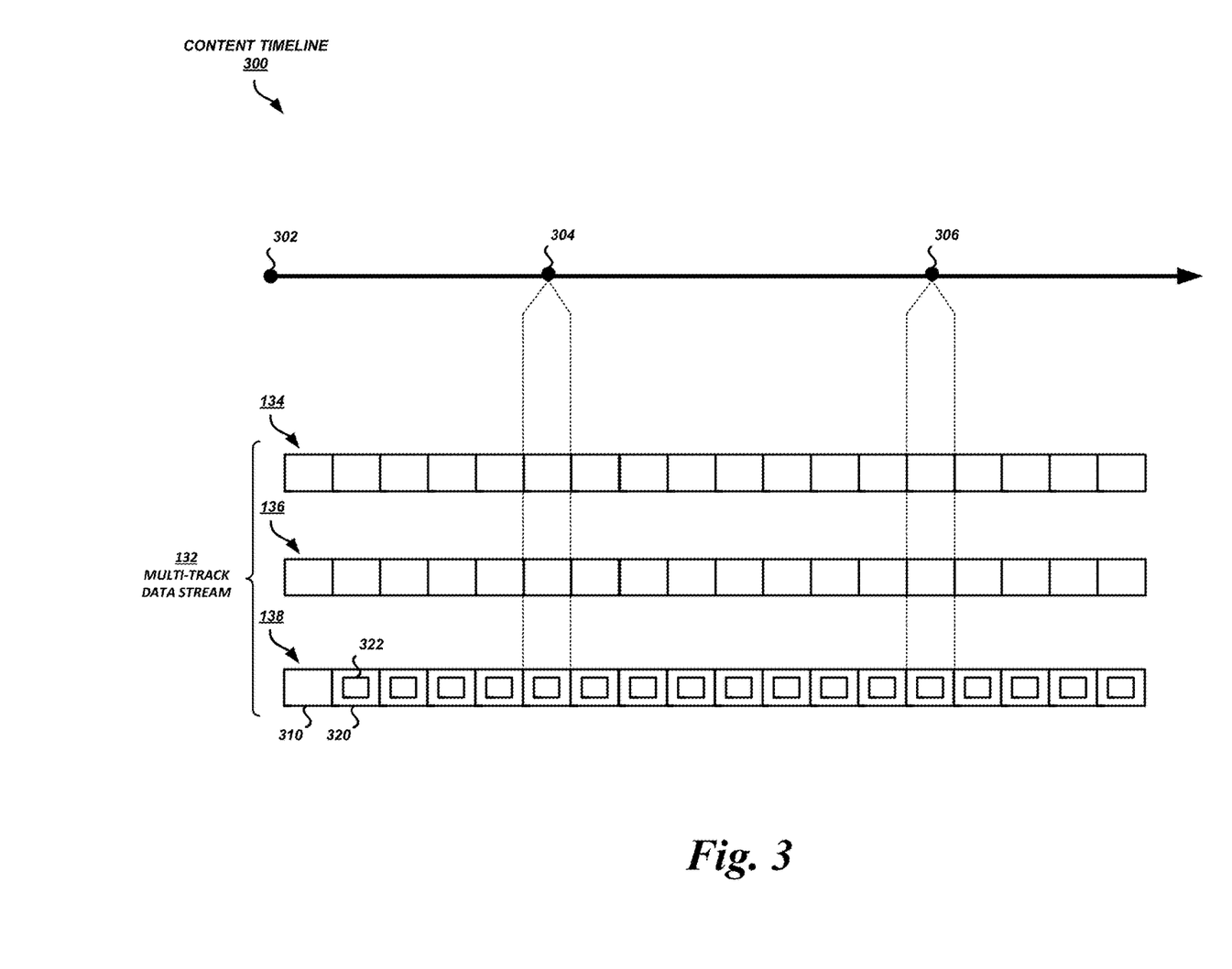
FIG. 3 is a timeline diagram illustrating a multi-track data stream according to some embodiments.

FIG. 3 shows a timeline 300 and an illustrative multi-track data stream 132 generated by the stream generation subsystem 130. At time point 302, the stream generation subsystem 130 may begin generating the multi-track data stream 132. In some embodiments, the stream generation subsystem 130 may include metadata in the stream, or individual tracks thereof, to indicate the content and/or source of the data in the various tracks. For example, header 310 may be included in the supplemental track 138 to identify the tracks: track 134 is the primary video track, track 136 is the primary audio track, and track 138 is the supplemental track that includes an alternate version of audio.

The stream generation subsystem 130 may generate the tracks 134, 136, and 138 as packets of data that are periodically transmitted to the content management system 100, and each packet may include data for the respective track 134, 136, or 138 that represents a corresponding content portion at a particular point in time or over a particular period of time. In some embodiments, as shown, the packets of the tracks 134, 136, and 138 may be arranged in the multi-track data stream 132 such that they are synchronized: packets for track 134 representing content at time point 304 may be transmitted within the multi-track data stream 132 at the same time as the packets for track 136 and 138 that represent corresponding content at time point 304; packets for track 134 representing content at time point 306 may be transmitted within the multi-track data stream 132 at the same time as the packets for track 136 and 138 that represent corresponding content at time point 306; etc. This synchronization of the data for the individual tracks within the multi-track data stream 132 can aid the content management system 100 in generating different version of content using different combinations of tracks.

In some embodiments, such as when the supplemental track 138 is a metadata track, the stream generation subsystem 130 may encode or otherwise process the data that is included in the supplemental track 138 into a different form than would otherwise be the case if the data was included in a primary video track 134 or primary audio track 136. For example, audio data (auxiliary content data 206 from the auxiliary content subsystem 128) may be represented by an audio data packet 320. The audio data packet 320 may then be encoded into a metadata packet 322 to be included in the metadata track. The encoding may result in the audio data packet 320 being wrapped in the metadata packet 322 such that the audio data packet 320 is the payload of the metadata packet 322, and the metadata packet 322 may include any other data elements (e.g., header information) typically included in a metadata packet.

Content Version Creation Using Multi-Track Data

Figure 4:
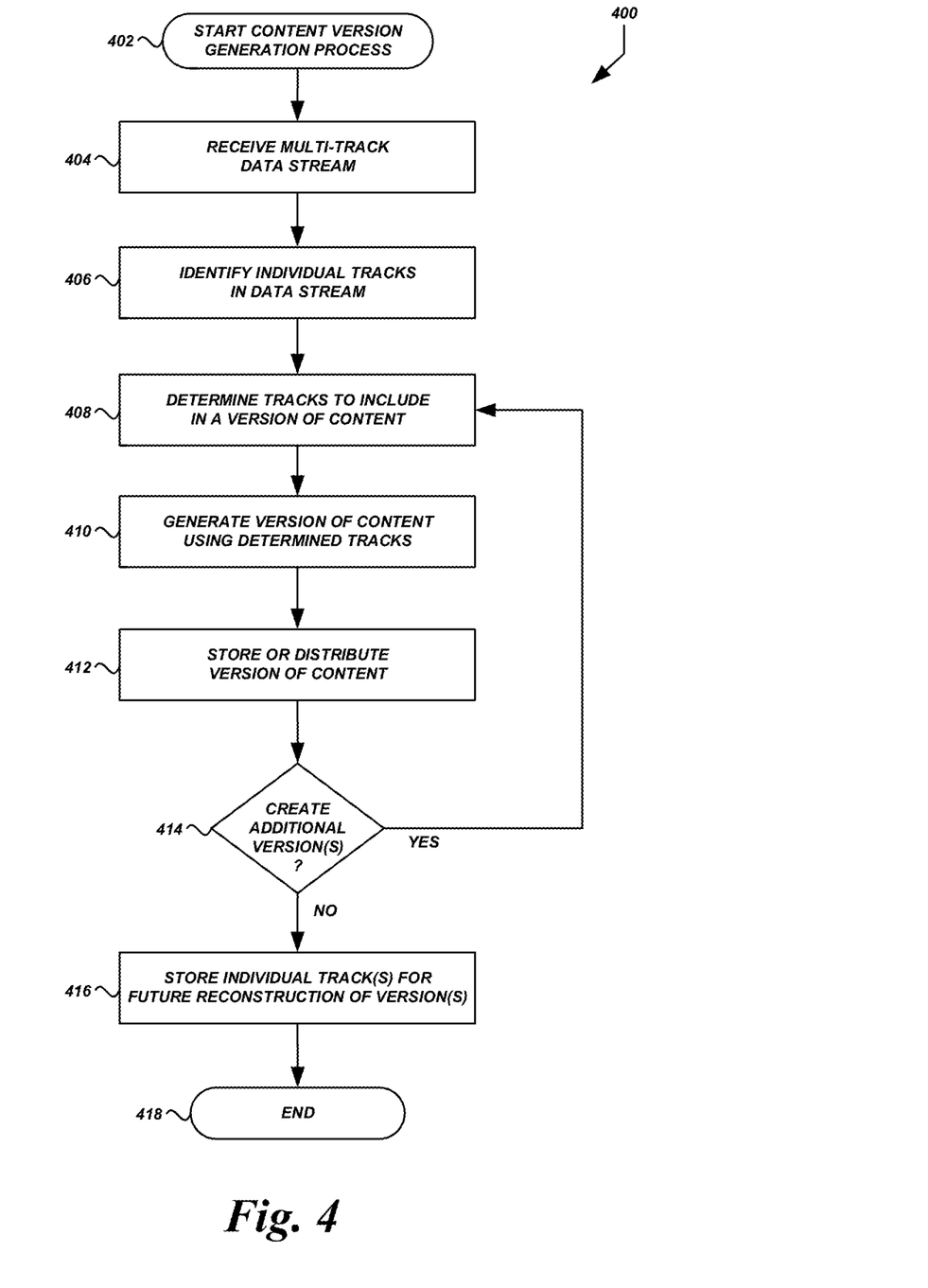
FIG. 4 is a flow diagram of an illustrative process for generating multiple versions of content using different combinations of tracks of a multi-track data stream according to some embodiments.

FIG. 4 is a flow diagram of an illustrative process 400 that may be executed by a content management system 100 to generate multiple versions of content using different combinations of tracks of a multi-track data stream. Portions of the process 400 will be described with further reference to the illustrative data flows and interactions between components of the content management system shown in FIG. 5.

The process 400 begins at block 402. The process 400 may begin in response to an event, such as when the content management system 100 begins operation, when the content management system 100 establishes a connection with a content producer 102, or in response to some other event. When the process 400 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 600 shown in FIG. 6 and described in greater detail below. For example, executable instructions for implementing the functionality of the ingestion subsystem 110 may be loaded into memory and executed by a processor. In some embodiments, the process 400 or portions thereof may be implemented on multiple processors, serially or in parallel.

At block 404, the ingestion subsystem 110 or some other module or component of the content management system 100 may begin receiving a multi-track data stream 132 of content from a content producer 102. For example, the multi-track data stream 132 may be received one packet or set of packets at time. If the content producer 102 is generating content for live streaming, packets of the multi-track data stream 132 may continue to be received in substantially real time for the duration of production of the content.

At block 406, the ingestion subsystem 110 or some other module or component of the content management system 100 may identify the individual tracks of the multi-track data stream 132. The individual tracks may be identified using headers or other metadata included in the multi-track data stream 132. For example, header 310 may be included in the supplemental track 138 of the multi-track data stream 132 to identify the tracks: track 134 is the primary video track, track 136 is the primary audio track, and track 138 is the supplemental track.

At block 408, the ingestion subsystem 110 or some other module or component of the content management system 100 may determine which track or tracks of the multi-track data stream 132 are to be included in the first version of content to be created. The ingestion subsystem 110 may make the determination(s) based on the particular version of content to be created, and the authorization attributes (if any) that are assigned to the various tracks for the particular version of content to be created. If the ingestion subsystem 110 is to generate a live stream version of the content for distribution to content consumers 104, the ingestion subsystem 110 may analyze authorization attributes that authorize and/or prohibit the inclusion of individual tracks in such a live stream version. In some embodiments, individual tracks may be associated with authorization attributes that expressly allow or do not expressly prohibit inclusion of the tracks in live stream versions of content. In some embodiments, individual tracks may be associated with authorization attributes that expressly prohibit or do not expressly allow inclusion of the tracks in live stream versions of content.

Authorization data representing the authorization attributes may be included in the multi-track data stream 132, stored at the content management system 100, or otherwise accessible to the ingestion subsystem 110. For example, the header 310 or other metadata associated with the multi-track data stream 132 may include authorization data. As another example, the ingestion subsystem 110 may access configuration data that includes authorization data for tracks. The configuration data may map authorization data to specific tracks (e.g., one authorization attribute is assigned to the primary video track 134, one authorization attribute is assigned to the supplemental track 138, etc.). In some embodiments, the configuration data may map authorization data to types of content or specific identities of content within the tracks. In this case, the ingestion subsystem 110 may determine the type of content or specific identity of the content within the tracks, which may be specified in the header 310 or other metadata associated with the multi-track data stream 132. The ingestion subsystem 110 may then determine the authorization attribute for individual tracks based on the attribute data corresponding to the content type or content identity associated with the tracks.

In some embodiments, inclusion and/or exclusion of tracks for specific versions of content may be determined using authorization attributes in combination with consumer attributes. A consumer attribute may be any attribute that can be used to distinguish between particular consumers or consumer groups in order to select or generate a version of content. The ingestion subsystem 110 may generate one or more versions of content based on the application of particular authorization attributes to consumers associated with particular consumer attributes. For example, a certain portion of content, such as auxiliary content, may be associated with an authorization attribute that prohibits distribution of the content in some geographic areas. A version of content that excludes tracks with the prohibited content may be generated for consumers in those geographic areas. When a consumer requests or is otherwise to be provided with content, the distribution subsystem 112 may evaluate a consumer attribute indicating the consumer's geographic location, and select the version created for that geographic location or otherwise prevent a version that includes the prohibited content from being provided to the consumer in that geographic location.

In some embodiments, inclusion and/or exclusion of tracks for specific versions of content may be determined using version rules or version definitions that do not necessarily relate authorization. For example, version definition data for a live stream version may indicate the tracks (or content within the tracks) that are to be included in and/or excluded from the live stream version, without any tie to security-based authorization, rights-based, authorization, or other forms of authorization.

At block 410, the ingestion subsystem 110 or some other module or component of the content management system 100 may generate a version of content using the tracks identified above. Generation of a version of content may include removing, from the multi-track data stream 132, any tracks that are not authorized or are otherwise not to be included in the version. In some cases, generation of a version of content may include generating a new multi-track data stream (or some other data stream) and including only the individual tracks (or data derived therefrom) in newly-generated stream. As used herein, "generating a version of content" should be understood to encompass at least these two methods, unless specifically stated otherwise.

Figure 5:
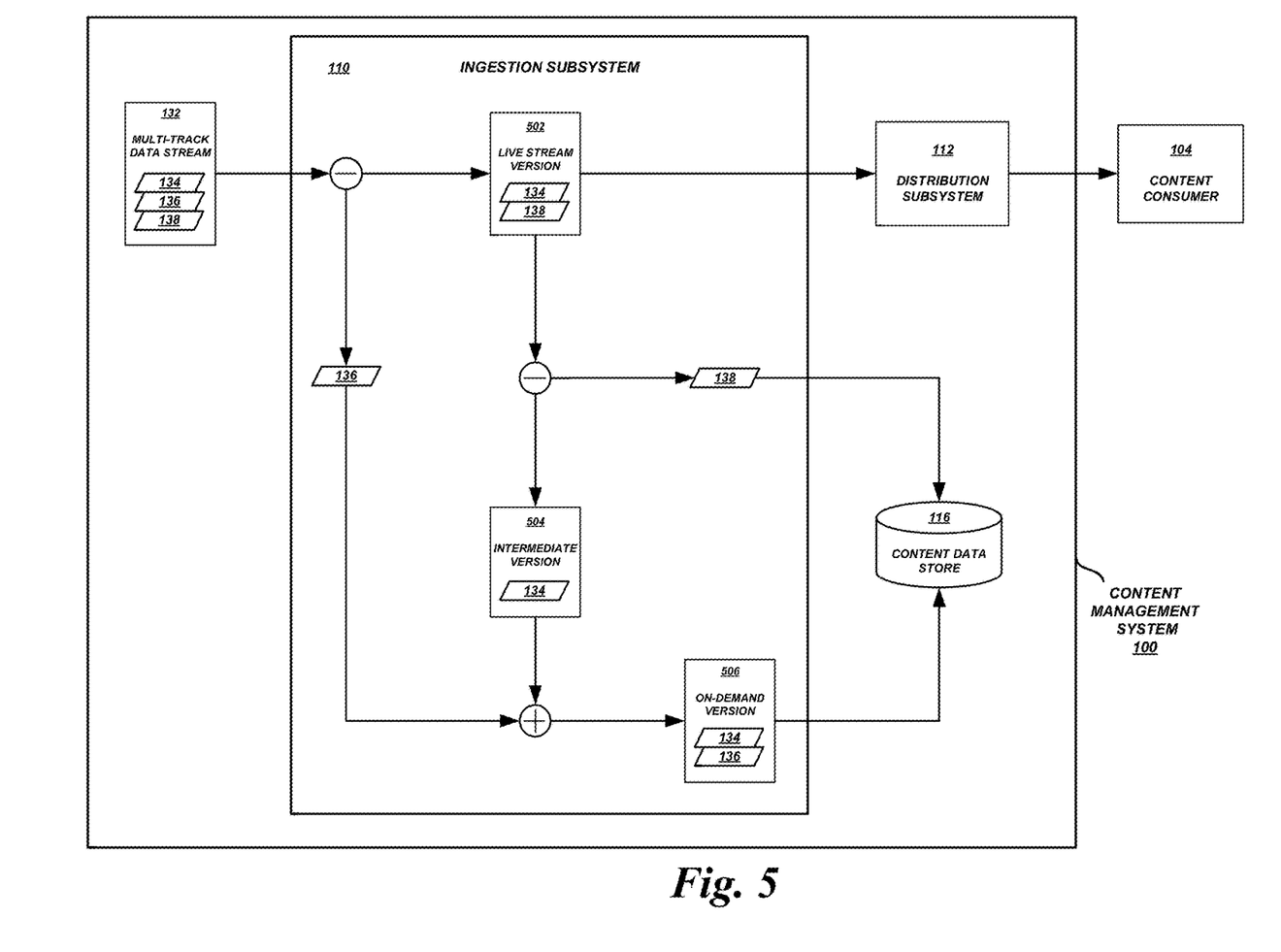
FIG. 5 is block diagram illustrating various data flows and interactions between components of a content management system to manage multi-track content according to some embodiments.

FIG. 5 shows example data flows and interactions that occur within the ingestion subsystem 110 and the content management system 100 as a whole to generate different versions of content from a multi-track data stream 132. The ingestion subsystem 110 may create a live stream version 502 from a combination of tracks of the multi-track data stream 132. In the illustrated example, the ingestion subsystem 110 determines, based on authorization data or version definition data, to include the primary video track 134 and the supplemental track 138 or data derived therefrom, such as a decoded version of audio content if audio content is encoded as metadata or in another form for transport in the supplemental track 138. The primary audio track 136 is excluded from the live stream version 502. This exclusion may be due to lack of an authorization attribute or version definition indicating that it permitted or required to be included, due to an authorization attribute or version definition prohibiting its inclusion, or due to the content of the primary audio track 136 (e.g., commentary only, with no background music) being redundant of, but less comprehensive than, the content of the supplemental track 138 (e.g., commentary plus background music). Although the live stream version 502 is shown with only the primary video track 134 and supplemental track 138, in some embodiments the supplemental track 138 may be included in the live stream version 502 as a new primary audio track, and the live stream version 502 may also include a new supplemental track. For example, if the data format of the live stream version 502 requires or permits a supplemental track, such as the inclusion of a metadata track in an RTMP data stream, the live stream version 502 may include such a supplemental track.

At block 412, the ingestion subsystem 110 or some other module or component of the content management system 100 may store the version generated above or otherwise provide it to some other module or component of the content management system 100. For example, if the version is a live stream version 502 to be distributed to content consumers 104 in substantially real time, the ingestion subsystem 110 may provide the version to the distribution subsystem 112 for managing distribution to content consumers 104. Due to the streaming nature of the content and its ongoing creation by the content producer 102, blocks 404, 406, 408, 410, and 412 (or a subset thereof) may be performed repeated in a looping or asynchronous manner to process the incoming multi-track data stream 132 and ultimately distribute it on an ongoing basis.

At decision block 414, the ingestion subsystem 110 or some other module or component of the content management system 100 may determine whether there is an additional version of the content to be generated. In some embodiments, the determination may be based on the content itself and/or on one or more rules regarding generating versions of content. For example, metadata included in the multi-track data stream 132 or received from the content producer 102 may identify the particular versions that are to be created. As another example, the ingestion subsystem 110 may access or be configured to automatically apply a rule to determine which versions to create based on individual tracks included in the multi-track data stream 132. If any additional versions are to be created, the process 400 may return to block 408. Otherwise, if no additional versions are to be created, the process 400 may proceed to block 416.

In one embodiment, an additional version of content may be created for storage rather than for live streaming. Thus, the process 400 returns to block 408. Creation of the additional version is described below with reference to FIG. 5. After each version is created, the ingestion subsystem 110 may determine at block 414 whether an additional version remains to be created. In some embodiments, portions of the process 400 may be performed in parallel or otherwise asynchronously to create additional versions, rather than being performed synchronously to create one version at a time.

Returning to FIG. 5, the ingestion subsystem 110 may generate a second version of the content, such as an on-demand version 506, using a different subset of tracks of the multi-track data stream 132. In the illustrated example, the ingestion subsystem 110 determines, based on authorization data or version definition data for the on-demand version 506, to include the primary video track 134 and the primary audio track 136. The supplemental track 138 is excluded from the on-demand version 506. This exclusion may be due to lack of an authorization attribute or version definition indicating that it permitted or required to be included, or due to an authorization attribute or version definition prohibiting its inclusion. In this example, the supplemental track 138 is excluded because it includes background music that is prohibited from—or otherwise not authorized to be included in—the on-demand version 506. Instead, the commentary-only content from the primary audio track 136 is included in the on-demand version 506.

To generate a second version of content after a first version has already been created, the ingestion subsystem 110 may generate a modified copy of the first version of content by removing tracks from the first version and/or adding tracks to the first version. For example, as shown in FIG. 5, the ingestion subsystem 110 may remove the supplemental track 138 from the live stream version 502 based on the determination that the on-demand version 506 is to include the primary audio track 136 and not the supplemental track 138. Removal of the supplemental track 138 may result in creation of an intermediate version 504 that includes a subset of the tracks to be included in the new version to be generated (the on-demand version 506 in this case). The ingestion subsystem 110 may then add, to the intermediate version 504, any additional tracks or other data that is authorized, permitted, or required to be included therein. In the illustrated example, the ingestion subsystem 110 includes the primary audio track 136. The on-demand version 506 may then be sent to another component of the content management system 100 for storage and/or distribution. For example, the on-demand version 506 may be stored in the content data store 116 and made available for distribution to content consumers 104 on demand.

Although the on-demand version 506 is shown without any supplemental track, in some embodiments a supplemental track may be included in the on-demand version, as described above with respect to the live stream version 502.

Returning to FIG. 4, at block 416 the ingestion subsystem 110 or some other module or component of the content management system 100 may store one or more tracks that have been excluded from one or more versions. Excluded tracks, or information regarding the excluded tracks, may be stored so that the original multi-component data stream 132 and/or various versions of content generated therefrom may be recreated in cases where the original multi-component data stream 132 and/or various versions of content generated therefrom are not retained as a whole. In some embodiments, it may be desirable to recreate versions that have not been saved, such as recreating a live stream version that was not stored for subsequent on-demand use. For example, it may be desirable to recreate a version for moderation purposes. As another example, authorization attributes associated within certain content or tracks may change. In such cases, it may be desirable to recreate a version with additional content if authorization attributes have changed to permit the additional content to be added, or it may be necessary to recover alternative tracks as replacements for tracks of stored versions if authorization attributes have changed to prohibit certain portions of saved versions of content. In the example illustrated in FIG. 5, the supplemental track 138 (including both commentary and background music that was subject to an authorization attribute prohibiting on-demand access) is stored in the content data store 116 so that it is available in the event that a particular version, such as the live stream version 502, is to be recreated. In some embodiments, data representing the excluded track(s) may be stored instead of, or in addition to, the excluded track(s). For example, rather than storing a supplemental track 138 that incudes background music that is subject to an authorization attribute prohibiting on-demand access, the ingestion subsystem 110 may store an identifier, address, or other data representing the background music. The data representing the excluded track is stored so that the live stream version 502 can be recreated or the content of the live stream version 502 can otherwise be determined at a later time in the absence of access to the live stream version 502 itself.

At block 418, process 400 may terminate.

Alternative Embodiments

Although many of the examples described herein relate to transmission of a multi-component stream from a content production system 102 to a separate content management system 100, in some embodiments the two systems (or individual components thereof) may be combined into a single system. For example, the content production system 102 may be configured to provide the functionality of the ingestion subsystem 110 described herein such that the content production system 102 produces different version of content for storage and/or distribution.

Although many of the examples described herein relate to multi-component data streams with only one video track and two audio tracks, the quantity and nature of the tracks in the examples are not intended to be exhaustive, limiting, or required. In some embodiments, a multi-component data stream may have two or more video tracks, one audio track, three or more audio tracks, or any combination thereof. For example, audio tracks for different languages may be included, video tracks from different angles or in different viewing resolution may be included, etc. In some embodiments, a multi-component data stream may also or alternatively include other data, such as text for closed caption display. The inclusion and/or exclusion operations for particular tracks and particular versions may operate in the same or a similar manner regardless of the nature of the specific tracks.

In some embodiments, different tracks may be transmitted by the content producer 102 and process by the content management system 100 in different streams altogether, rather than in a single multi-track stream. For example, each additional audio track may be sent as an independent audio-only RTMP stream. The different streams may be different physical streams transmitted over different network connections, or they may be different logical streams sent over a single network connection. Tracks may be associated with a particular content item by specifying a same identifier (e.g., a "streamkey") in combination with an additional parameter specifying its nature as only audio (e.g., "streamkey=XXX&alt_audio=VOICE_ONLY"). The ingestion subsystem 110 may ingest the stream that includes the primary video track (and optionally a primary audio track) in combination with all of the independent audio streams, and process them accordingly based on their specifications, authorization attributes, version definitions, and the like.

In some embodiments, different versions or portions of content may be sent within a single track rather than being separated into individual tracks within a multi-track stream. For example, some audio encoders are configured to generate an audio track with one, two, or more audio channels. In such cases, the primary audio content (e.g., commentary plus background music) and auxiliary content (e.g., commentary only) may be sent as different channels within a single audio track.

In some embodiments, individual portions of content may be separated into different tracks. This is in contrast with combining some portions of content into one track and then including a different combination or subset of the portions in a different track. For example, many examples herein describe a primary audio track including both commentary and background music, and a supplemental track including only the commentary. However, rather than duplicating one component (e.g., including commentary in one track with background music, and in another track without background music), the different components may be included individually in separate tracks. In this example, one track (e.g., the primary audio track") may be used to transmit the commentary alone and another track (e.g., the supplemental track) may be used to transmit the background music alone. The content management system 100 may then generate different audio tracks for different version of content by mixing audio from any subset of tracks authorized, permitted, or required to be included in the various versions.

In some embodiments, a graphical user interface may be provided to allow users to specify which tracks are to be included in particular versions of content. For example, a user interface may allow users to set authorization attributes, version definitions, and the like. The user interface may be used users of content production systems 102, administrators of the content management system 100, third-party content managers (e.g., copyright owners), etc. One example interface for selecting content sources to be included in a data stream is disclosed in U.S. Pat. No. 10,437,551, issued on Oct. 8, 2019 and titled "Application Subset Selective Audio Capture," which is incorporated by reference herein and attached as an appendix. The interface disclosed therein may be modified to allow selection or specification of authorization attributed, selection or specification of different combinations of tracks for different versions of content, etc.

Execution Environment

Figure 6:
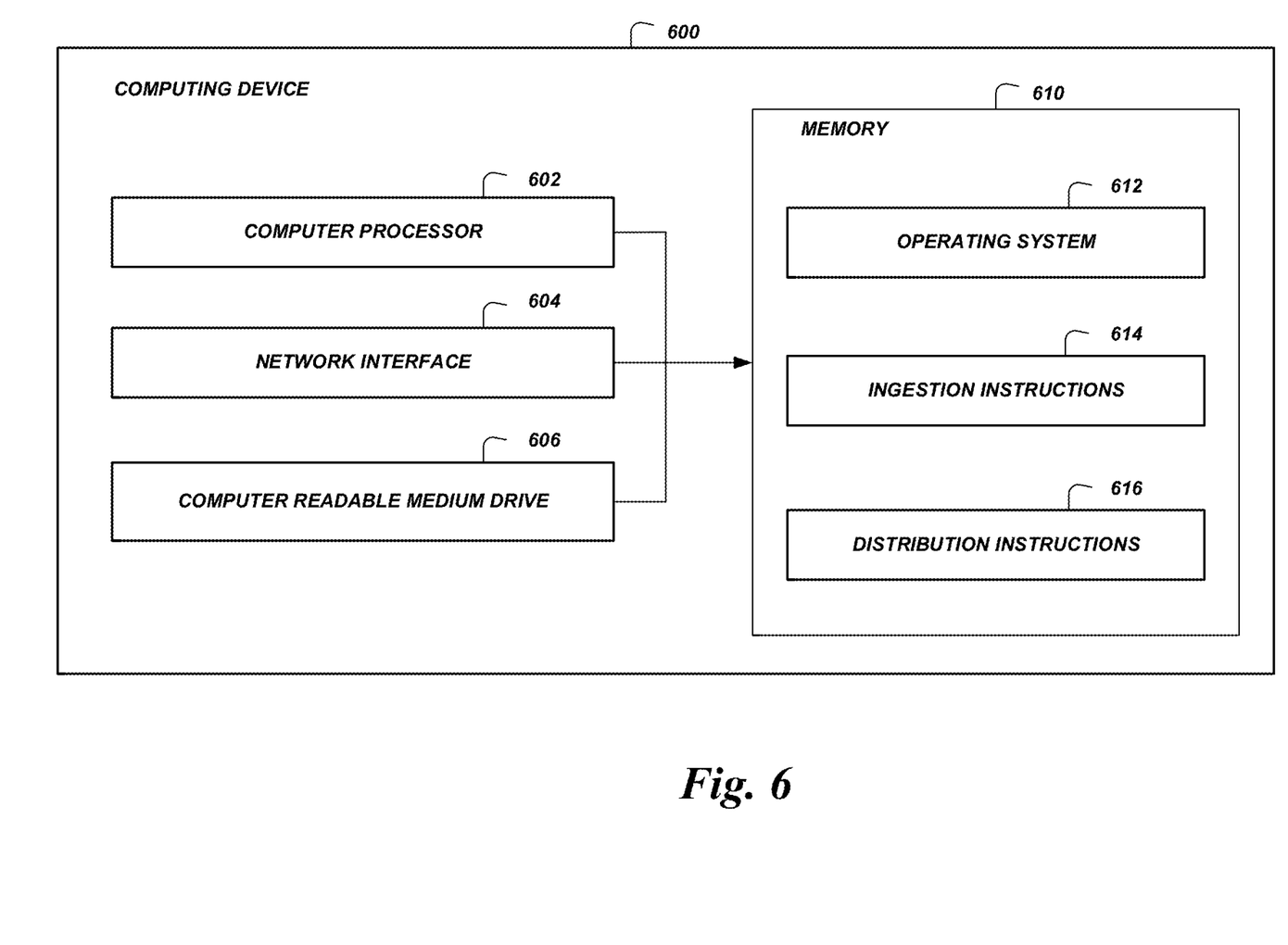
FIG. 6 is a block diagram illustrating components of a computing device configured to execute processes for managing multi-track content according to some embodiments.

FIG. 6 illustrates the various components of an example computing device 600 configured to implement various functionality of the content management system 100. In some embodiments, as shown, the computing device 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; and one or more computer readable memories 610, such as random access memory ("RAM") and/or other volatile non-transitory computer-readable media.

The computer readable memory 610 may include computer program instructions that one or more computer processors 602 execute in order to implement one or more embodiments. The computer readable memory 610 can store an operating system 612 that provides computer program instructions for use by the computer processor(s) 602 in the general administration and operation of the computing device 600. In some embodiments, the computer readable memory 610 can further include computer program instructions and other information for implementing aspects of the present disclosure. For example, in one embodiment, the computer-readable memory 610 may include ingestion instructions 614 for implementing features of the ingestion subsystem 110, distribution instructions 616 for implementing features of the distribution subsystem 112, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A content management system comprising:
  computer-readable memory storing executable instructions; and
  one or more computing devices in communication with the computer-readable memory and programmed by the executable instructions to at least:
    receive a multi-track data stream comprising a plurality of tracks, wherein the plurality of tracks comprises:
      a primary video track comprising first data encoded in a video data format;
      a primary audio track comprising second data encoded in an audio data format;
      a supplemental track comprising third data encoded in a metadata format;
    determine that at least one of the primary audio track or the supplemental track is not to be stored based on being associated with an authorization attribute prohibiting on-demand distribution;
    generate a live stream content item using the multi-track data stream,
    wherein the live stream content item includes the primary video track and the at least one of the primary audio track or the supplemental track that is not to be stored;
    provide the live stream content item to a consumer device;
    generate an on-demand content item using the multi-track data stream,
    wherein the on-demand content item comprises primary video track and excludes the at least one of the primary audio track or the supplemental track that is not to be stored; and store the on-demand content item in a content data store.

2. The content management system of claim 1, wherein:
the second data comprises audio data representing user commentary;
the third data comprises audio data representing auxiliary audio content associated with the authorization attribute; and
the at least one of the primary audio track or the supplemental track that is not to be stored comprises the supplemental track.

3. The content management system of claim 1, wherein:
the second data comprises audio data representing user commentary;
the third data comprises audio data representing user commentary and auxiliary audio content associated with the authorization attribute; and
the at least one of the primary audio track or the supplemental track that is not to be stored comprises the supplemental track.

4. The content management system of claim 1, wherein the one or more computing devices are further programmed to extract, from the third data encoded in the metadata format, audio data representing at least one of user commentary or music.

5. A computer-implemented method comprising:
under control of one or more computing devices configured with specific computer executable instructions,
receiving a multi-track data stream comprising a plurality of tracks of a content item, wherein the plurality of tracks comprises:
a first track comprising first media data encoded in a first format; and
a second track comprising second media data encoded in a second format;
determining that the first track is associated with an authorization attribute prohibiting the first track from being distributed according to a first distribution protocol of a plurality of distribution protocols, wherein the first distribution protocol comprises storage of a first version of the content item for on-demand distribution;
generating, using the multi-track data stream, the first version of the content item for distribution according to the first distribution protocol, wherein the first version includes the second track and excludes the first track;
storing the first version; and
generating, using the multi-track data stream, a second version of the content item for distribution according to a second distribution protocol of the plurality of distribution protocols, wherein the second version includes the first track.

6. The computer-implemented method of claim 5, further comprising providing the first version to a consumer device according to the first distribution protocol in response to a request, from the consumer device, for on-demand distribution of the first version.

7. The computer-implemented method of claim 5, further comprising providing the second version to a consumer device according to the second distribution protocol, wherein the second distribution protocol is associated with live streaming distribution.

8. The computer-implemented method of claim 5, further comprising extracting, from at least one of the first track or the second track, audio data representing at least one of user commentary or music, wherein the audio data is encoded in an audio format.

9. The computer-implemented method of claim 5, further comprising extracting, from at least one of the first track or the second track, audio data representing at least one of user commentary or music, wherein the audio data is encoded in a metadata format.

10. The computer-implemented method of claim 5, further comprising determining the authorization attribute based at least partly on an identity of content included in the first track.

11. The computer-implemented method of claim 5, further comprising determining the authorization attribute based at least partly on metadata included in the multi-track data stream.

12. The computer-implemented method of claim 5, wherein determining that the first track is associated with the authorization attribute comprises determining that the first track is associated with at least one of: a copyright prohibition, a copyright permission, a security prohibition, or a security permission.

13. The computer-implemented method of claim 5, further comprising:
storing, in a content data store, at least one of: the first track, or data representing the first track; and
generating, based at least partly on a moderation request, a representation of a live stream version of the content item using the first track.

14. A system comprising:
computer-readable memory storing executable instructions; and
one or more computing devices in communication with the computer-readable memory and programmed by the executable instructions to at least:
receive a multi-track data stream comprising a plurality of tracks of a content item, wherein the plurality of tracks comprises:
a first track comprising first media data encoded in a first format; and
a second track comprising second media data encoded in a second format;
determine, based on an authorization attribute associated with the first track, that the first track is not to be distributed according to a first distribution protocol of a plurality of distribution protocols, wherein the first distribution protocol comprises storage of a first version of the content item for on-demand distribution;
generate, using the multi-track data stream, the first version of the content item for distribution according to the first distribution protocol, wherein the first version includes the second track and excludes the first track;
store the first version;
generate, using the multi-track data stream, a second version of the content item for distribution according to a second distribution protocol of the plurality of distribution protocols, wherein the second version includes the first track.

15. The system of claim 14, wherein the one or more computing devices are further programmed by the executable instructions to:
receive a request from a consumer device for the content item;

determine a consumer attribute associated with the consumer device;

determine, based at least partly on the consumer attribute and the authorization attribute, that the consumer device is not permitted to access the first track; and provide, to the consumer device, the first version excluding the first track.

16. The system of claim 15, wherein the consumer attribute comprises a geographic location of the consumer device, and wherein the authorization attribute comprises a geographic restriction on access to the first track.

17. The system of claim 15, wherein the one or more computing devices are further programmed by the executable instructions to:

receive a second request from a second consumer device for the content item;

determine a second consumer attribute associated with the second consumer device;

determine, based at least partly on the second consumer attribute and the authorization attribute, that the second consumer device is permitted to access the first track; and provide, to the second consumer device, the second version including the first track.

18. The system of claim 14, wherein the first media data represents user commentary encoded in an audio format, and wherein the second media data represents music audio data encoded in a metadata format.

19. The system of claim 14, wherein the first media data represents a combination of user commentary and music, wherein the second media data represents the user commentary excluding the music.

20. The system of claim 14, wherein the plurality of tracks further comprises a supplemental track comprising third data representing one of: metadata, text, subtitles, audio data, or video data.

* * * * *